US011735903B2

(12) United States Patent
Liu et al.

(10) Patent No.: US 11,735,903 B2
(45) Date of Patent: Aug. 22, 2023

(54) TRANSFORMER WITH FLUX LINKAGE CONTROL AND METHOD FOR SUPPRESSING MAGNETIZING INRUSH CURRENT OF TRANSFORMER

(71) Applicant: XI'AN JIAOTONG UNIVERSITY, Shaanxi (CN)

(72) Inventors: Yibin Liu, Shaanxi (CN); Deliang Liang, Shaanxi (CN); Yang Liang, Shaanxi (CN); Mingkang Zhang, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 351 days.

(21) Appl. No.: 17/055,497

(22) PCT Filed: Jun. 22, 2018

(86) PCT No.: PCT/CN2018/092507
§ 371 (c)(1),
(2) Date: Nov. 13, 2020

(87) PCT Pub. No.: WO2019/218423
PCT Pub. Date: Nov. 21, 2019

(65) Prior Publication Data
US 2022/0271526 A1    Aug. 25, 2022

(30) Foreign Application Priority Data
May 15, 2018    (CN) .......................... 201810462659.7

(51) Int. Cl.
*H02H 7/04*  (2006.01)
*H01F 27/28* (2006.01)
(Continued)

(52) U.S. Cl.
CPC .............. *H02H 7/04* (2013.01); *H01F 27/28* (2013.01); *H02H 9/02* (2013.01); *H02M 7/5387* (2013.01)

(58) Field of Classification Search
CPC ............ H02H 7/04; H02H 9/02; H02H 9/002; H02M 7/5387; H02M 1/008; H01F 27/38; H01F 27/28; H01H 27/341
(Continued)

(56) References Cited

U.S. PATENT DOCUMENTS 5,864,474 A * 1/1999 Jang .......................... H02J 3/32
307/64
2020/0189404 A1* 6/2020 Haugan ................... B60L 53/50

* cited by examiner

Primary Examiner — Danny Nguyen (57) ABSTRACT

A method for suppressing magnetizing inrush current of the transformer with flux linkage control includes connecting a small-capacity direct current/alternating current (DC/AC) converter with the secondary winding or auxiliary winding of transformer, detecting the primary side phase voltage before closing load, inducing the core flux linkage reference according to the relationship between the winding voltage and core flux linkage. The core flux linkage closed-loop PI control system is constructed to control the converter voltage in the synchronous coordinate, then the core flux linkage can track its reference with no static error, thus the sinusoidal flux linkage with 90-degree difference from the grid voltage can be pre-established in the core before no-load closing. By these methods, no matter when the main transformer closes, the core flux linkage is always in the steady state, and the magnetizing inrush current can be eliminated completely.

10 Claims, 3 Drawing Sheets

(51) Int. Cl.
*H02H 9/02* (2006.01)
*H02M 7/5387* (2007.01)

(58) Field of Classification Search
USPC .......................................................... 361/35
See application file for complete search history.

Fig. 4b

TRANSFORMER WITH FLUX LINKAGE CONTROL AND METHOD FOR SUPPRESSING MAGNETIZING INRUSH CURRENT OF TRANSFORMER

CROSS REFERENCE OF RELATED APPLICATION

This is a U.S. National Stage under 35 U.S.C 371 of the International Application PCT/CN2018/092507, filed Jun. 22, 2018, which claims priority under 35 U.S.C. 119(a-d) to CN 201810462659.7, filed May 15, 2018.

BACKGROUND OF THE PRESENT INVENTION

Field of Invention

The present invention relates to the field of transformer technology, and more particularly to a method for suppressing magnetizing inrush current of a transformer.

Description of Related Arts

When the transformer switches on and connects to the power grid with no-load, the core flux linkage will not only contain the sinusoidal steady-state component, but also contain the direct current (DC) component (DC magnetic bias). If the DC magnetic bias is large, the iron core will saturate, causing magnetizing inrush current. Although the magnetizing inrush current lasts for a short time, it can be 6-8 times the rated current, which will cause misoperation of the protection device. Currently, many scientists and technicians have carried out researches on the detection and identification of magnetizing inrush current to avoid the misoperation of the relay protection device. In fact, the magnetizing inrush current is very harmful to the sensitive equipment in the power grid. In addition, the harmonic and reactive components in the magnetizing inrush current are often large, which will also damage the power grid. Therefore, the elimination of the magnetizing inrush current can fundamentally solve the above problems.

In fact, the magnitude of the magnetizing inrush current is closely related to the degree of DC magnetic bias of the iron core, and the magnitude of the DC magnetic bias is closely related to the remanence of the iron core and the closing time of the transformer. In theory, by accurately measuring the polarity and magnitude of the remanence, and controlling the closing phase angle of the circuit breaker, the DC magnetic bias becomes zero, so that the magnetizing inrush current can be effectively suppressed. However, in fact, the transformer is generally closed by a vacuum circuit breaker, and the closing time scatter is difficult to be avoided, therefore, the precise phase control is difficult to be achieved.

For the traditional transformer, the core flux linkage before closing the transformer contains the remanence. After closing the transformer, the core flux linkage is determined by the grid voltage. Since the grid voltage is uncontrollable, the core flux linkage is also uncontrollable. Therefore, in order to eliminate the magnetizing inrush current, the flux linkage control must be realized before closing the transformer.

SUMMARY OF THE PRESENT INVENTION

An object of the present invention is to provide a transformer with flux linkage control and a method for suppressing magnetizing inrush current of the transformer with flux linkage control.

To achieve the above object, the present invention provides technical solutions as follows.

A transformer with flux linkage control comprises a main transformer, a direct current/alternating current (DC/AC) converter and an auxiliary small power source that connected with the dc-link capacitor of the DC/AC converter in parallel. The DC/AC converter is connected with the secondary winding or the auxiliary winding of the main transformer. In single-phase applications, the main transformer is a single-phase dual-winding transformer or a single-phase three-winding transformer, the DC/AC converter is a single-phase full-bridge converter. In three-phase applications, the main transformer is a three-phase dual-winding transformer or a three-phase three-winding transformer, the DC/AC converter is a three-phase half-bridge converter which comprises two split dc-link capacitors, wherein a neutral line for the two split dc-link capacitors is drawn out.

Preferably, the transformer with the flux linkage control further comprises a core flux linkage control module to establish a synchronous steady-state flux linkage for the main transformer core before the main transformer is connected to the power grid by controlling the DC/AC converter.

Preferably, before the main transformer is closed with no-load, the terminal voltage of the DC/AC converter can be controlled by the core flux linkage control module, and the core flux linkage of the main transformer can track its given steady-state references in real time, then the DC magnetic bias can be eliminated.

Preferably, regardless of the three-phase or single-phase applications, when the dual-winding structure is adopted, the main transformer comprises a primary winding and a secondary winding; when the three-winding structure is adopted, the main transformer comprises a primary winding, a second winding and an auxiliary winding, wherein the primary winding of the main transformer is connected with the power grid through a grid-side circuit breaker, and the secondary winding supplies power for the load.

Preferably, the single-phase full-bridge converter comprises an inductor, a dc-link capacitor, and two bridge arms connected with each other in parallel. The three-phase half-bridge converter comprises an a-phase inductor, a b-phase inductor and a c-phase inductor. The three bridge arms connect with the a-phase inductor, the b-phase inductor and the c-phase inductor in parallel, and a dc-link capacitor unit, respectively. The dc-link capacitor unit comprises two split dc-link capacitors connected with each other in series, the auxiliary small power source comprises a current-limiting resistor, a DC-side circuit breaker and a battery connected with each other in series to charge the split dc-link capacitors before closing the transformer. After the main transformer is connected to the grid power, the DC-side circuit breaker will disconnect to disable the auxiliary power source.

Preferably, in the single-phase applications, when the dual-winding structure is adopted, the single-phase full-bridge converter is connected with the secondary winding in parallel. When the three-winding structure is adopted, the single-phase full-bridge converter is connected with the auxiliary winding in parallel. In the three-phase applications, when the dual-winding structure is adopted, the secondary windings supply power for the load by a three-phase four-wire method. an a-phase output end, a b-phase output end and a c-phase output end of the three-phase half-bridge converter all of which are drawn out from a midpoint of the dc-link capacitor unit are respectively connected with a beginning of the a-phase secondary winding, a beginning of the b-phase secondary winding and a beginning of the c-phase secondary winding, the midpoint of the dc-link capacitor unit is connected with a neutral point of the a-phase secondary winding, the b-phase secondary winding and the c-phase secondary winding; when the three-winding structure is adopted, the auxiliary windings adopt a star-shaped neutral point connection method, the a-phase output end, the b-phase output end and the c-phase output end of the three-phase half-bridge converter all of which are drawn out from the midpoint of the dc-link capacitor unit are respectively connected with a beginning of the a-phase auxiliary winding, a beginning of the b-phase auxiliary winding and a beginning of the c-phase auxiliary winding, the midpoint of the dc-link capacitor unit is connected with a neutral point of the a-phase auxiliary winding, the b-phase auxiliary winding and the c-phase auxiliary winding.

A method for suppressing no-load closing magnetizing inrush current of a transformer with flux linkage control comprises: connecting a direct current/alternating current (DC/AC) converter with a secondary winding or an auxiliary winding of an original transformer (namely, the main transformer mentioned above) in parallel, and pre-establishing a synchronous steady-state flux linkage for the main transformer core by controlling the DC/AC converter before the main transformer is connected to a power grid, so as to completely eliminate the magnetizing inrush current when the power grid is closed.

Preferably, the method for suppressing the no-load closing magnetizing inrush current of the transformer with the flux linkage control specifically comprises:

(1) before the main transformer is closed with no-load through the grid-side circuit breaker, charging the dc-link capacitor of the DC/AC converter through an auxiliary power source with small power, and when the voltage of the dc-link capacitor of the DC/AC converter reaches a stable value, disabling the auxiliary power source; and (2) controlling the core flux linkage by controlling a terminal voltage of the DC/AC converter, tracking given steady-state references in real time by the core flux linkage of the main transformer for eliminating DC magnetic bias to fundamentally eliminate the magnetizing inrush current, and stopping the DC/AC converter after the grid-side circuit breaker is closed for finishing tracking.

Preferably, in the step of (2), controlling the core flux linkage specifically comprises: in single-phase applications, detecting a single-phase grid voltage, calculating a phase of the single-phase grid voltage through a single-phase phase locked loop (PLL), and taking the phase as a phase reference signal during coordinate transformation; according to a relationship between an amplitude of the core flux linkage and an effective value of the grid voltage, calculating the amplitude of the core flux linkage, and taking the calculated amplitude as a reference value of q-axis flux linkage in a dq synchronous rotating coordinate system; detecting an instantaneous value of the core flux linkage, constructing a quadrature flux linkage signal of the instantaneous value in a two-phase static coordinate system through 90-degree delay, performing coordinate transformation on the quadrature flux linkage signal in the two-phase static coordinate system, taking a q-axis flux linkage signal in the dq synchronous rotating coordinate system obtained by the coordinate transformation as an instantaneous feedback value of the core flux linkage, sending a deviation of the instantaneous feedback value from the reference value to a PI (proportional integral) controller, obtaining a q-axis modulation signal of the core flux linkage by calculating, setting a d-axis modulation signal of the core flux linkage to 0, performing inverse coordinate transformation on the q-axis modulation signal in the dq synchronous rotating coordinate system, obtaining a modulation signal in a static coordinate system, performing sinusoidal pulse width modulation (SPWM) on a α-axis modulation signal of the core flux linkage in the static coordinate system, obtaining a driving pulse of the single-phase full-bridge converter, and the single-phase full-bridge converter sending out a pulse voltage for controlling the core flux linkage.

Preferably, in the step of (2), controlling the core flux linkage specifically comprises: in three-phase applications, detecting a three-phase grid voltage, calculating a phase of the three-phase grid voltage through a three-phase phase locked loop (PLL), and taking the phase as a phase reference signal during coordinate transformation; according to a relationship between an amplitude of the core flux linkage and an effective value of the grid voltage, calculating the amplitude of the core flux linkage, taking the amplitude as a reference value of q-axis flux linkage in a dq0 synchronous rotating coordinate system, and setting a reference value of d-axis flux linkage and a reference value of 0-axis flux linkage to 0; detecting an instantaneous value of the three-phase core flux linkage, obtaining an a-axis flux linkage signal, a b-axis flux linkage signal and a c-axis flux linkage signal of a three-phase static coordinate system, performing coordinate transformation on the a-axis flux linkage signal, the b-axis flux linkage signal and the c-axis flux linkage signal of the three-phase static coordinate system, obtaining a d-axis flux linkage signal, a q-axis flux linkage signal and a 0-axis flux linkage signal in the dq0 synchronous rotating coordinate system, respectively taking the d-axis flux linkage signal, the q-axis flux linkage signal and the 0-axis flux linkage signal as an instantaneous feedback value of the d-axis flux linkage, an instantaneous feedback value of the q-axis flux linkage, and an instantaneous feedback value of the 0-axis flux linkage, sending a deviation of the instantaneous feedback value of the d-axis flux linkage from the reference value of the d-axis flux linkage, a deviation of the instantaneous feedback value of the q-axis flux linkage from the reference value of the q-axis flux linkage, and a deviation of the instantaneous feedback value of the 0-axis flux linkage from the reference value of the 0-axis flux linkage to the PI controller, obtaining a d-axis modulation signal, a q-axis modulation signal and a 0-axis modulation signal, performing inverse coordinate transformation on the d-axis modulation signal, the q-axis modulation signal and the 0-axis modulation signal in the dq0 synchronous rotating coordinate system, obtaining an a-axis modulation signal, a b-axis modulation signal and a c-axis modulation signal of a three-phase static coordinate system, performing SPWM on the a-axis modulation signal, the b-axis modulation signal and the c-axis modulation signal, obtaining a driving pulse of the three-phase half-bridge converter, and the three-phase half-bridge converter sending out a pulse voltage for controlling the core flux linkage, wherein a neutral line for split dc-link capacitors of the dc-link capacitor unit is drawn out.

Preferably, in the step of (2), the driving pulse of the DC/AC converter is blocked after the grid-side circuit breaker is closed, the DC/AC converter is stopped working, thereby finishing tracking.

Compared with the prior art, the present invention has some beneficial effects as follows.

According to the present invention, the DC/AC converter is connected with the main transformer, the sinusoidal steady-state flux linkage which is synchronized with the grid voltage is pre-established in the iron core through the DC/AC converter, so as to effectively avoid the magnetizing inrush current caused by DC magnetic bias. The present invention has no restriction on the closing time of the circuit breaker, no need to accurately control the closing phase angle of the circuit breaker, and does not have the problem of dispersion at the closing time, so that whenever the circuit breaker is closed, the flux linkage is directly in a steady state, thereby fundamentally eliminating the magnetizing inrush current.

DETAILED DESCRIPTION OF THE PREFERRED EMBODIMENT

The present invention is further explained in detail with accompanying drawings and embodiments as follows. It should be understood that the embodiments described here are only used to explain the present invention, but not to limit the present invention.

The present invention provides a method for suppressing no-load closing magnetizing inrush current of a transformer with flux linkage control, which is suitable for single-phase or three-phase applications, and is able to be achieved by a dual-winding transformer or a three-winding transformer.

Figure 1A:
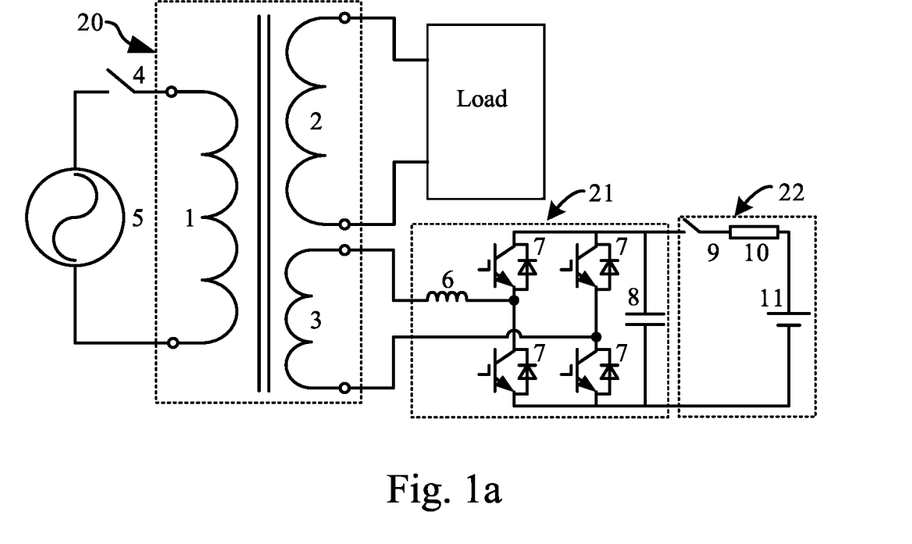
FIG. 1a shows a circuit topology of a single-phase three-winding transformer with suppressed magnetizing inrush current.

As shown in FIG. 1a, a single-phase three-winding device for suppressing no-load closing magnetizing inrush current of a transformer with flux linkage control is illustrated, wherein the single-phase three-winding device comprises a single-phase three-winding transformer 20, a single-phase full-bridge converter 21 and an auxiliary power source 22. The single-phase three-winding transformer 20 comprises a primary winding 1, a secondary winding 2 and an auxiliary winding 3. The single-phase full-bridge converter 21 comprises an inductor 6, a dc-link capacitor 8, a left bridge arm and a right bridge arm, wherein each of the left bridge arm and the right bridge arm comprises two switch components 7, each of the switch components is embodied as an insulated gate bipolar transistor (IGBT), the left bridge arm and the right bridge arm are both connected with the dc-link capacitor 8 in parallel; one end of the inductor 6 is connected with a midpoint of the left bridge arm, another end of the inductor 6 is connected with one output end of the single-phase full-bridge converter 21, a midpoint of the right bridge arm is connected with another output end of the single-phase full-bridge converter 21. The auxiliary power source 22 comprises a DC-side circuit breaker 9, a current-limiting resistor 10 and a battery 11 three of which are connected with each other in series. One end of the primary winding 1 is connected with a grid power 5 through a grid-side circuit breaker 4, the secondary winding 2 is configured to supply power for a load, the auxiliary power source 22 is connected with the dc-link capacitor 8 in parallel. The one output end and the another output end of the single-phase full-bridge converter 21 are connected with two ends of the auxiliary winding 3, respectively.

Figure 1B:
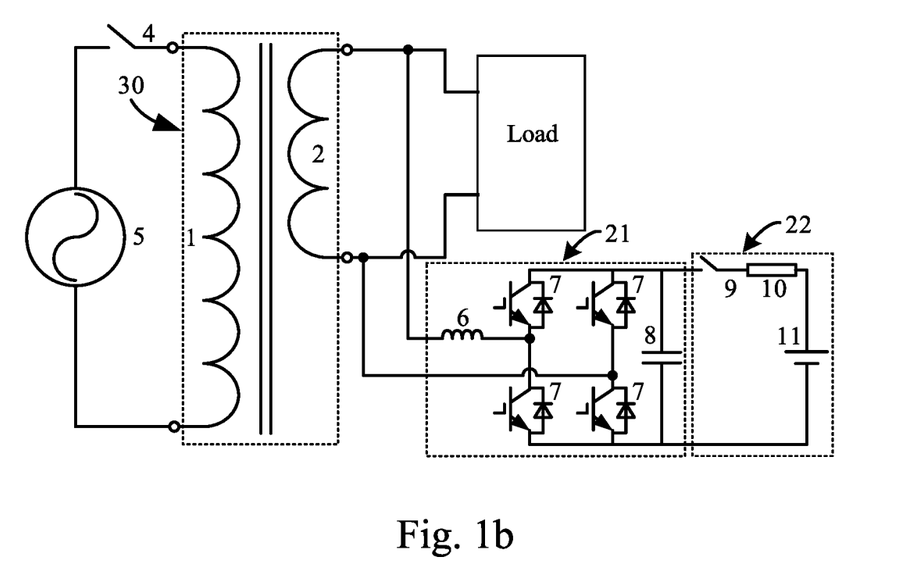
FIG. 1b shows a circuit topology of a single-phase dual-winding transformer with suppressed magnetizing inrush current.

Referring to FIG. 1b, a single-phase dual-winding device for suppressing no-load closing magnetizing inrush current of a transformer with flux linkage control is illustrated, wherein the single-phase dual-winding device comprises a single-phase dual-winding transformer 30, a single-phase full-bridge converter 21 and an auxiliary power source 22. The single-phase dual-winding transformer 30 comprises a primary winding 1 and a secondary winding 2. Two output ends of the single-phase full-bridge converter 21 are connected with two ends of the secondary winding 2 in parallel, respectively. A specific structure and a connection relationship of the single-phase full-bridge converter 21 and the auxiliary power source 22, a connection mode of the primary winding 1 and a grid power 5, and a connection mode of the secondary winding 2 and a load in FIG. 1b are the same as those in FIG. 1a.

Figure 2A:
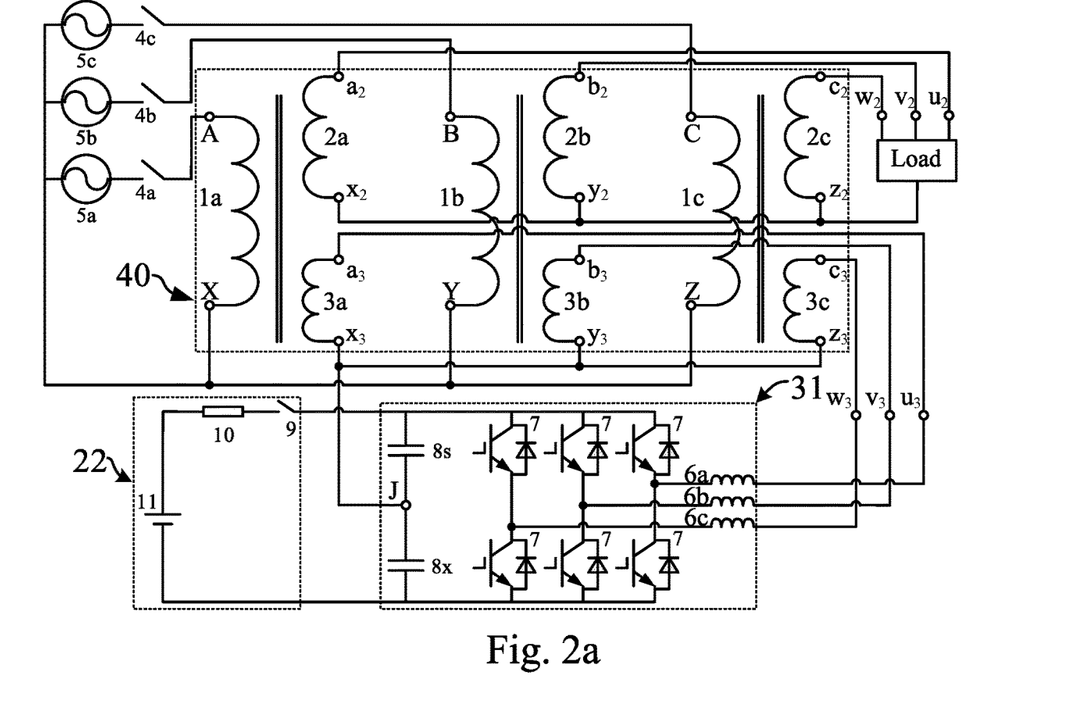
FIG. 2a shows a circuit topology of a three-phase three-winding transformer with suppressed magnetizing inrush current.

Referring to FIG. 2a, a three-phase three-winding device for suppressing no-load closing magnetizing inrush current of a transformer with flux linkage control is illustrated, wherein the three-phase three-winding device comprises a three-phase three-winding transformer 40, a three-phase half-bridge converter 31 and an auxiliary power source 22. The three-phase three-winding transformer 40 comprises an a-phase primary winding 1a, a b-phase primary winding 1b, a c-phase primary winding 1c, an a-phase secondary winding 2a, a b-phase secondary winding 2b, a c-phase secondary winding 2c, an a-phase auxiliary winding 3a, a b-phase auxiliary winding 3b and a c-phase auxiliary winding 3c. A beginning and an ending A/X, B/Y and C/Z of the a-phase primary winding 1a, the b-phase primary winding 1b and the c-phase primary winding 1c, a beginning and an ending $a_2/x_2$, $b_2/y_2$ and $c_2/z_2$ of the a-phase secondary winding 2a, the b-phase secondary winding 2b and the c-phase secondary winding 2c, a beginning and an ending $a_3/x_3$, $b_3/y_3$ and $c_3/z_3$ of the a-phase auxiliary winding 3a, the b-phase auxiliary winding 3b and the c-phase auxiliary winding 3c are labeled in FIG. 2a. The three-phase half-bridge converter 31 comprises an a-phase inductor 6a, a b-phase inductor 6b, a c-phase inductor 6c, a first split dc-link capacitor 8s, a second split dc-link capacitor 8x and a three-phase bridge arm unit which comprises six switch components 7, each of the switch components is embodied as an insulated gate bipolar transistor (IGBT). The first split dc-link capacitor 8s is connected with the second split dc-link capacitor 8x in series to form a dc-link capacitor unit for supporting dc-link, a neutral line for the first split dc-link capacitor 8s and the second split dc-link capacitor 8x acts as a midpoint J of the dc-link capacitor unit. The three-phase bridge arm unit comprises three bridge arms each of which is connected with the dc-link in parallel. One end of the a-phase inductor 6a, one end of the b-phase inductor 6b and one end of the c-phase inductor 6c are connected with three midpoints of the three bridge arms, respectively; another end of the a-phase inductor 6a, another end of the b-phase inductor 6b and another end of the c-phase inductor 6c act as an a-phase output end u₃, a b-phase output end v₃ and a c-phase output end w₃ of the three-phase half-bridge converter 31. The auxiliary power source 22 is connected with the dc-link in parallel. Through star midpoint connection method, the a-phase primary winding 1a, the b-phase primary winding 1b and the c-phase primary winding 1c are connected with an a-phase grid power 5a, a b-phase grid power 5b and a c-phase grid power 5c through an a-phase grid-side circuit breaker 4a, a b-phase grid-side circuit breaker 4b and a c-phase grid-side circuit breaker 4c, respectively. Specifically, one end of the a-phase grid-side circuit breaker 4a, one end of the b-phase grid-side circuit breaker 4b and one end of the c-phase grid-side circuit breaker 4c are connected with one end of the a-phase grid power 5a, one end of the b-phase grid power 5b and one end of the c-phase grid power 5c, respectively; another end of the a-phase grid-side circuit breaker 4a, another end of the b-phase grid-side circuit breaker 4b and another end of the c-phase grid-side circuit breaker 4c are connected with the beginning A of the a-phase primary winding 1a, the beginning B of the b-phase primary winding 1b, and the beginning C of the c-phase primary winding 1c, respectively; the ending X of the a-phase primary winding 1a, the ending Y of the b-phase primary winding 1b, and the ending Z of the c-phase primary winding 1c are all connected with a neutral point of the grid power. The a-phase secondary winding 2a, the b-phase secondary winding 2b and the c-phase secondary winding 2c supply power for the load through a three-phase four-wire method, which is specifically described as follows. The beginning $a_2$ of the a-phase secondary winding 2a, the beginning $b_2$ of the b-phase secondary winding 2b and the beginning $c_2$ of the c-phase secondary winding 2c are connected with an a-phase terminal $u_2$, a b-phase terminal $v_2$ and a c-phase terminal $w_2$ of the load, respectively; the ending $x_2$ of the a-phase secondary winding 2a, the ending $y_2$ of the b-phase secondary winding 2b and the ending $z_2$ of the c-phase secondary winding 2c are all connected with a neural point of the load. The three-phase half-bridge converter 31 is connected with the a-phase auxiliary winding 3a, the b-phase auxiliary winding 3b and the c-phase auxiliary winding 3c, which is specifically described as follows. The a-phase output end u₃, the b-phase output end v₃ and the c-phase output end w₃ of the three-phase half-bridge converter 31 are connected with the beginning $a_3$ of the a-phase auxiliary winding 3a, the beginning $b_3$ of the b-phase auxiliary winding 3b and the beginning $c_3$ of the c-phase auxiliary winding 3c, respectively; the ending $x_3$ of the a-phase auxiliary winding 3a, the ending $y_3$ of the b-phase auxiliary winding 3b and the ending $z_3$ of the c-phase auxiliary winding 3c are all connected with the midpoint J of the dc-link capacitor unit.

Figure 2B:
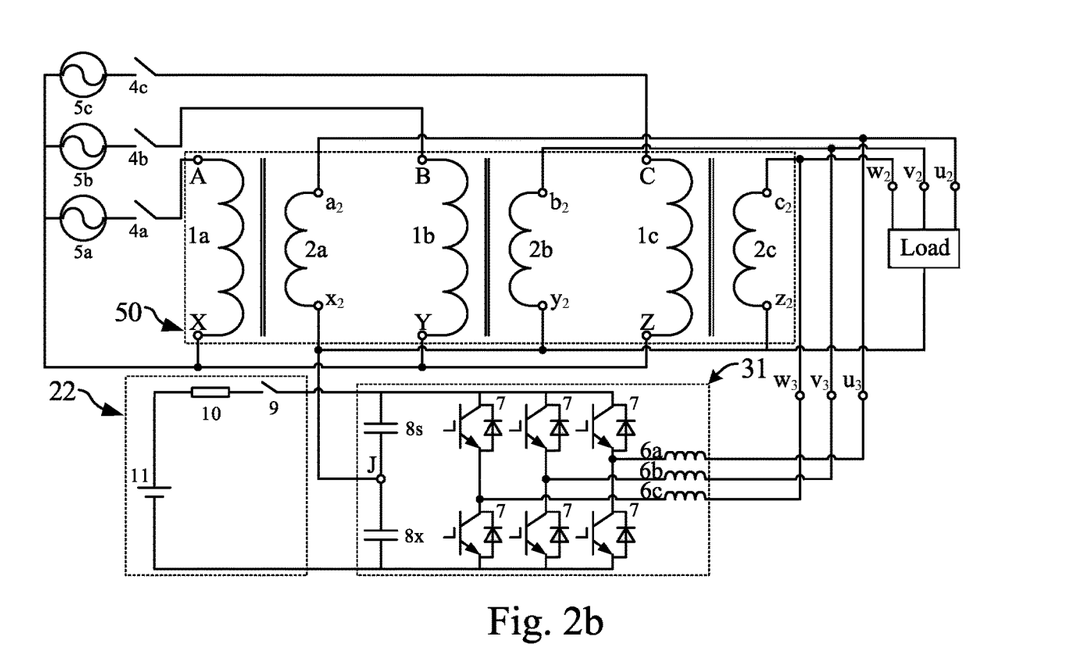
FIG. 2b shows a circuit topology of a three-phase dual-winding transformer with suppressed magnetizing inrush current.

Referring to FIG. 2b, a three-phase dual-winding device for suppressing no-load closing magnetizing inrush current of a transformer with flux linkage control is illustrated, wherein the three-phase dual-winding device comprises a three-phase dual-winding transformer 50, a three-phase half-bridge converter 31 and an auxiliary power source 22. The three-phase dual-winding transformer 50 comprises an a-phase primary winding 1a, a b-phase primary winding 1b, a c-phase primary winding 1c, an a-phase secondary winding 2a, a b-phase secondary winding 2b and a c-phase secondary winding 2c. A connection relationship between the a-phase primary winding 1a, the b-phase primary winding 1b, the c-phase primary winding 1c and the a-phase grid power 5a, the b-phase grid power 5b, the c-phase grid power 5c, a connection relationship between the a-phase secondary winding 2a, the b-phase secondary winding 2b, the c-phase secondary winding 2c and the load, a specific structure and a connection relationship of the three-phase half-bridge converter 31 and the auxiliary power source 22 in FIG. 2b are the same as those in FIG. 2a. The difference is that the three-phase half-bridge converter 31 is connected with the a-phase secondary winding 2a, the b-phase secondary winding 2b and the c-phase secondary winding 2c in parallel, which is specifically described as follows. The a-phase output end u₃, the b-phase output end v₃ and the c-phase output end w₃ of the three-phase half-bridge converter 31 are connected with the beginning $a_2$ of the a-phase secondary winding 2a, the beginning $b_2$ of the b-phase secondary winding 2b and the beginning $c_2$ of the c-phase secondary winding 2c, respectively; the ending $x_2$ of the a-phase secondary winding 2a, the ending $y_2$ of the b-phase secondary winding 2b and the ending $z_2$ of the c-phase secondary winding 2c are all connected with the midpoint J of the dc-link capacitor unit.

Accordingly, a method for suppressing no-load closing magnetizing inrush current of a transformer with flux linkage control comprises:

according to the single-phase applications shown in FIGS. 1a and 1b, firstly disconnecting the grid-side circuit breaker 4, and then closing the DC-side circuit breaker 9, the battery 11 charging the dc-link capacitor 8 through the current-limiting resistor 10, or according to the three-phase applications shown in FIGS. 2a and 2b, firstly disconnecting the a-phase grid-side circuit breaker 4a, the b-phase grid-side circuit breaker 4b and the c-phase grid-side circuit breaker 4c, and then closing the DC-side circuit breaker 9, the battery 11 charging the first split dc-link capacitor 8s and the second split dc-link capacitor 8x both of which are connected with each other in series through the current-limiting resistor 10; regardless of the single-phase or three-phase applications, when a capacitance of the dc-link reaches a stable value, disabling the auxiliary power source by disconnecting the DC-side circuit breaker 9, and then the core magnetic flux quickly tracking given sinusoidal steady-state magnetic flux by performing flux linkage control with the converter, thereby avoiding DC magnetic bias and suppressing the magnetizing inrush current.

Figure 3A:
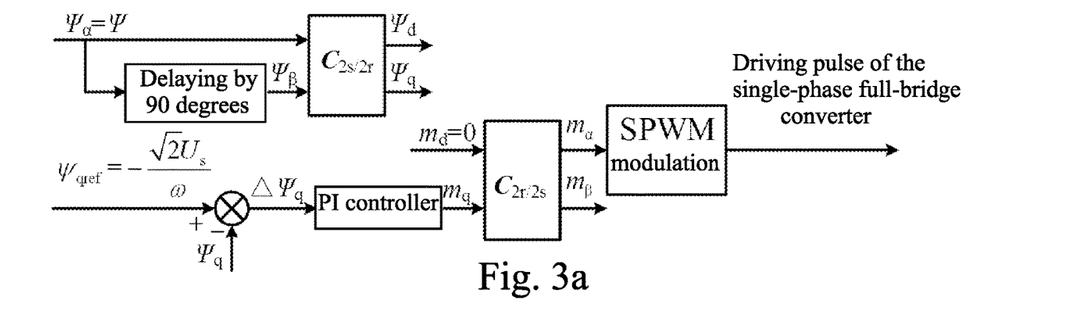
FIG. 3a is a control block diagram of core flux linkage of a transformer for single-phase applications.

FIG. 3(a) is a flow chart of the flux linkage control for the single-phase applications, which is specifically as follows. Assuming that a measured single-phase real-time flux linkage value of an iron core is $\Psi$ through flux linkage observation, taking the measured real-time flux linkage value as a flux linkage signal $\Psi_\alpha$ of a α axis in a two-phase static coordinate system, that is, taking $\Psi_\alpha = \Psi$, delaying $\Psi_\alpha$ by 90 degrees, constructing a flux linkage signal $\Psi_\beta$ of a β axis which is orthogonal to $\Psi_\alpha$, performing coordinate transformation on $\Psi_\alpha$ and $\Psi_\beta$ through a formula (I), and obtaining flux linkage signals $\Psi_d$ and $\Psi_q$ in a synchronous rotating coordinate system, wherein the formula (I) is $$\begin{cases} \Psi_{2r} = C_{2s/2r} \Psi_{2s} \\ \Psi_{2r} = \begin{bmatrix} \Psi_d \\ \Psi_q \end{bmatrix}, C_{2s/2r} = \begin{bmatrix} \sin \omega t & -\cos \omega t \\ \cos \omega t & \sin \omega t \end{bmatrix}, \Psi_{2s} = \begin{bmatrix} \Psi_\alpha \\ \Psi_\beta \end{bmatrix}, \end{cases} \quad (I)$$

here, ω is grid angular frequency, t is time;

under a q-axis, establishing a flux linkage closed-loop control system, setting a given signal of q-axis flux linkage as $\Psi_{qref}$, wherein $\Psi_{qref}$ is obtained by a formula of $$\Psi_{qref} = -\frac{\sqrt{2}\,U_s}{\omega}, \quad \text{(II)}$$

here, $U_s$ is an effective value of a grid voltage;

taking a deviation $\Delta\Psi_q$ of $\Psi_{qref}$ and $\Psi_q$ as an input of a proportional integral (PI) controller, taking an output of the PI controller as a q-axis modulation signal $m_q$, setting a d-axis modulation signal $m_d$ to be 0, and obtaining a α-axis modulation signal $m_\alpha$ and a β-axis modulation signal $m_\beta$ in the two-phase static coordinate system through inverse coordinate transformation, wherein the inverse coordinate transformation is expressed by a formula of $$\begin{cases} m_{2s} = C_{2r/2s} m_{2r} \\ m_{2s} = \begin{bmatrix} m_\alpha \\ m_\beta \end{bmatrix},\ m_{2r} = \begin{bmatrix} m_d \\ m_q \end{bmatrix},\ C_{2r/2s} = \begin{bmatrix} \sin\omega t & \cos\omega t \\ -\cos\omega t & \sin\omega t \end{bmatrix}; \end{cases} \quad \text{(III)}$$

and modulating the α-axis modulation signal $m_\alpha$, obtaining a driving pulse of the single-phase full-bridge converter 21, and controlling a terminal voltage of the single-phase full-bridge converter for realizing the flux linkage control.

Figure 3B:
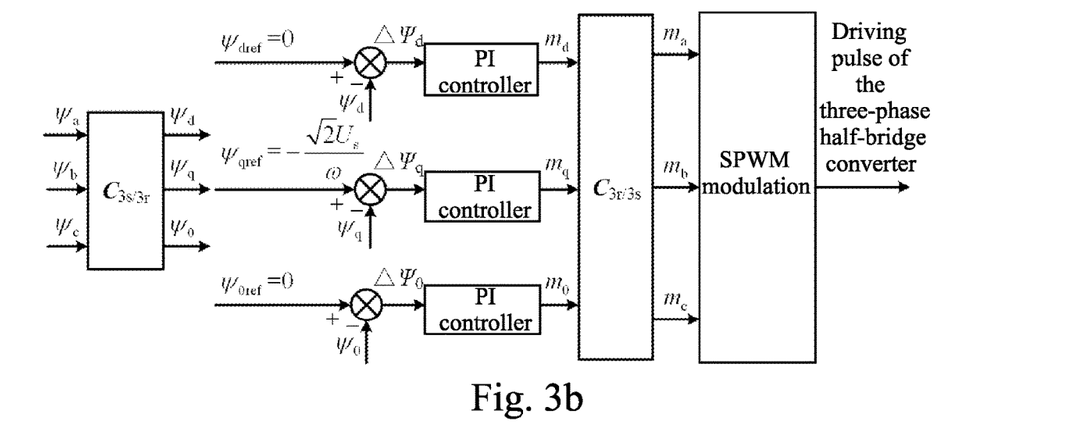
FIG. 3b is a control block diagram of core flux linkage of a transformer for three-phase applications.

FIG. 3(b) is a flow chart of the flux linkage control for the three-phase applications, which is specifically as follows. Assuming that measured three-phase real-time flux linkage values of an iron core are $\Psi_a$, $\Psi_b$ and $\Psi_c$ through flux linkage observation, respectively taking the measured three-phase real-time flux linkage values as an a-axis flux linkage signal, a b-axis flux linkage signal and a c-axis flux linkage signal in a three-phase static coordinate system, performing coordinate transformation on $\Psi_a$, $\Psi_b$ and $\Psi_c$ by a formula (IV), and obtaining flux linkage signals $\Psi_d$, $\Psi_q$ and $\Psi_0$ in a synchronous rotating coordinate system, wherein the formula (IV) is $$\begin{cases} \Psi_{3r} = C_{3s/3r} \Psi_{3s} \\ \Psi_{3r} = \begin{bmatrix} \Psi_d \\ \Psi_q \\ \Psi_0 \end{bmatrix},\ C_{3s/3r} = \frac{2}{3}\begin{bmatrix} \sin\omega t & \sin\left(\omega t - \frac{2\pi}{3}\right) & \sin\left(\omega t + \frac{2\pi}{3}\right) \\ \cos\omega t & \cos\left(\omega t - \frac{2\pi}{3}\right) & \cos\left(\omega t + \frac{2\pi}{3}\right) \\ \frac{1}{2} & \frac{1}{2} & \frac{1}{2} \end{bmatrix},\ \Psi_{3s} = \begin{bmatrix} \Psi_a \\ \Psi_b \\ \Psi_c \end{bmatrix}; \end{cases} \quad \text{(IV)}$$

under a d-axis, a q-axis and a 0-axis, establishing a flux linkage closed-loop control system, respectively setting given signals of d-axis flux linkage, q-axis flux linkage and 0-axis flux linkage as $\Psi_{dref}$, $\Psi_{qref}$ and $\Psi_{0ref}$ which are obtained by a formula (V) of $$\begin{cases} \Psi_{dref} = 0 \\ \Psi_{qref} = -\dfrac{\sqrt{2}\,U_s}{\omega} \\ \Psi_{0ref} = 0 \end{cases} \quad \text{(V)}$$

taking a deviation $\Delta\Psi_d$ of $\Psi_{dref}$ and $\Psi_d$, a deviation $\Delta\Psi_q$ of $\Psi_{qref}$ and $\Psi_q$ and a deviation $\Delta\Psi_0$ of $\Psi_{0ref}$ and $\Psi_0$ as inputs of a proportional integral (PI) controller, taking outputs of the PI controller as a d-axis modulation signal $m_d$, a q-axis modulation signal $m_q$ and a 0-axis modulation signal $m_0$, and obtaining an a-axis modulation signal $m_a$, a b-axis modulation signal $m_b$ and a c-axis modulation signal $m_c$ in the three-phase static coordinate system through inverse coordinate transformation, wherein the inverse coordinate transformation is expressed by a formula (VI) of $$\begin{cases} m_{3s} = C_{3r/3s} m_{3r} \\ m_{3s} = \begin{bmatrix} m_a \\ m_b \\ m_c \end{bmatrix},\ m_{3r} = \begin{bmatrix} m_d \\ m_q \\ m_0 \end{bmatrix}, \\ C_{3r/3s} = \begin{bmatrix} \sin\omega t & \cos\omega t & 1 \\ \sin\left(\omega t - \frac{2\pi}{3}\right) & \cos\left(\omega t - \frac{2\pi}{3}\right) & 1 \\ \sin\left(\omega t + \frac{2\pi}{3}\right) & \cos\left(\omega t + \frac{2\pi}{3}\right) & 1 \end{bmatrix}; \text{and} \end{cases} \quad \text{(VI)}$$

modulating the a-axis modulation signal $m_a$, the b-axis modulation signal $m_b$ and the c-axis modulation signal $m_c$, obtaining a driving pulse of the three-phase half-bridge converter 31, and controlling a terminal voltage of the three-phase half-bridge converter for realizing the flux linkage control.

Figure 4A:
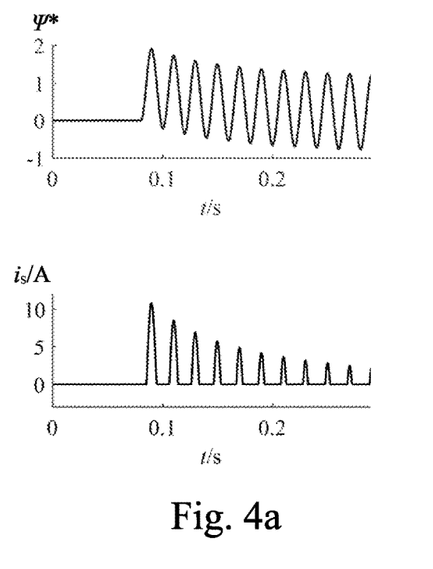
FIG. 4a shows waveforms of per unit value of core flux linkage before and after magnetizing inrush current suppression, and current waveforms of primary winding with no flux linkage control.
Figure 4B:
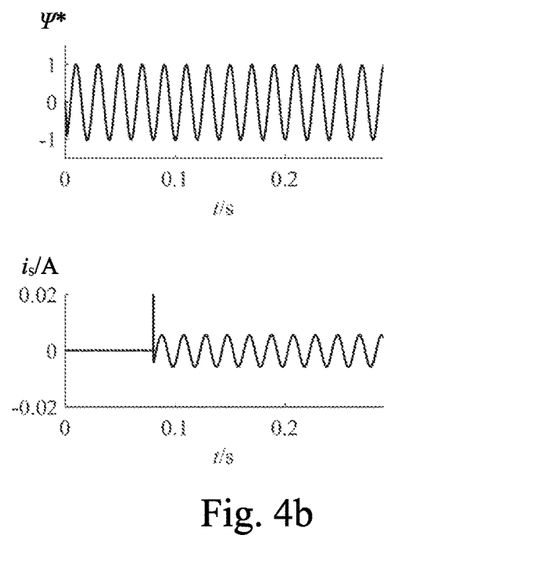
FIG. 4b shows waveforms of per unit value of core flux linkage before and after magnetizing inrush current suppression, and current waveforms of primary winding with flux linkage control.

Based on the above circuit topology and control flow, a simulation model of a flux linkage closed-loop control system of a transformer is able to be constructed. Referring to FIG. 4, by comparing the simulation waveforms of per unit value of the core flux linkage and the actual current of the primary windings with or without flux linkage control, it is able to be seen that when there is no flux linkage control, after no-load closing (t=0.08 s), there is often an obvious DC magnetic bias in the iron core (wherein the per unit value reaches 2), which causes the iron core to saturate and induces a large magnetizing inrush current (wherein a current peak value reaches 10 A, which is about 5 times a rated current). After adding the flux linkage control, before closing the transformer (before t=0.08 s), the core flux linkage has entered the sinusoidal steady state in advance through the closed-loop tracking control, its waveform is synchronized with the grid voltage, and its phase is 90 degrees later than the grid voltage, which is equivalent to pre-establishing the core flux linkage during steady-state operation of the transformer before closing the transformer. Therefore, no matter when the transformer is closed afterwards, it will not cause DC magnetic bias, which is able to fundamentally eliminate the magnetizing inrush current.

The above control flow is able to be programmed in a digital signal processor (DSP) (TMSF28335). The specific hardware implementation of the control flow is as follows: firstly obtaining a flux linkage signal of the transformer through a flux linkage observer, inputting the flux linkage signal to an ADC pin of the DSP through a conditioning circuit formed by an operational amplifier, converting the inputted flux linkage signal into a digital signal through a ADC module inside the DSP, obtaining a PWM driving pulse signal of the single-phase full-bridge converter or the three-phase half-bridge converter by calculating in the DSP as shown in FIG. 3a, transmitting the PWM driving pulse signal to a level conversion and drive circuit through a PWM output pin of the DSP for power amplification, applying the amplified PWM driving pulse signal to a drive port of an insulated gate bipolar transistor (IGBT) through an output signal line of a drive circuit, so as to realize the control of the output voltage of the converter for further completing the flux linkage control of the transformer.

In short, a DC/AC converter with small-capacity (the value is determined according to transformer capacity) is connected to the secondary winding or the auxiliary winding of the transformer. Before closing the transformer, the phase of the primary-side grid voltage is detected. According to the relationship between the voltage of the iron core and the core flux linkage, reference instructions of the core flux linkage are deduced, referring to formulas II and V. In the synchronous rotating coordinate system, the core flux linkage closed-loop PI control system is constructed for controlling the output voltage of the converter, so as to make the core flux linkage track the reference value of the flux linkage without static error. Therefore, a sinusoidal synchronous flux linkage with a phase difference of 90 degrees from the grid voltage is pre-established in the iron core before closing the transformer. Through the above measures, no matter when the transformer is closed, the core flux linkage will be directly in a steady-state without transient process, thereby completely eliminating the magnetizing inrush current.

What is claimed is:

1. A transformer with flux linkage control, the transformer comprising a main transformer, a direct current/alternating current (DC/AC) converter and an auxiliary power source, wherein the main transformer has a single-phase dual-winding structure or a single-phase three-winding structure, and the DC/AC converter is a single-phase full-bridge converter; or the main transformer has a three-phase dual-winding structure or a three-phase three-winding structure, and the DC/AC converter is a three-phase half-bridge converter, a neutral line for splitting two dc-link capacitors of the three-phase half-bridge DC/AC converter is drawn out; wherein the auxiliary power source is connected with the dc-link capacitors of the DC/AC converter in parallel, and output ends of the DC/AC converter are connected with a secondary winding or an auxiliary winding of the main transformer.

2. The transformer with flux linkage control according to claim 1, further comprising a core flux linkage control module to establish a synchronous steady-state flux linkage for a main transformer core before the main transformer is connected to a power grid by controlling the DC/AC converter.

3. The transformer with flux linkage control according to claim 2, wherein before the main transformer is closed with no-load, a terminal voltage of the DC/AC converter is controlled by the core flux linkage control module, and the core flux linkage of the main transformer tracks given steady-state references thereof in real time, so as to eliminate DC magnetic bias.

4. The transformer with flux linkage control according to claim 1, wherein when a dual-winding structure is adopted, the main transformer comprises a primary winding and the secondary winding, the output ends of the DC/AC converter are connected with the secondary winding of the main transformer; when a three-winding structure is adopted, the main transformer comprises the primary winding, the secondary winding and an auxiliary winding, the output ends of the DC/AC converter are connected with the auxiliary winding of the main transformer; the primary winding of the main transformer is connected with a power grid through a grid-side circuit breaker, and the secondary winding supplies power for a load.

5. The transformer with flux linkage control according to claim 1, wherein the single-phase full-bridge converter comprises an inductor, a dc-link capacitor, and two bridge arms connected with each other in parallel, the secondary winding or the auxiliary winding of the main transformer is connected with a midpoint of one bridge arm through the inductor; the three-phase half-bridge converter comprises an a-phase inductor, a b-phase inductor and a c-phase inductor, three bridge arms respectively connected with the a-phase inductor, the b-phase inductor and the c-phase inductor in parallel, and a dc-link capacitor unit, wherein the dc-link capacitor unit comprises two dc-link capacitors connected with each other in series; an a-phase secondary winding or an a-phase auxiliary winding, a b-phase secondary winding or a b-phase auxiliary winding, and a c-phase secondary winding or a c-phase auxiliary winding of the main transformer are connected with a midpoint of an a-phase bridge arm, a b-phase bridge arm and a c-phase bridge arm through an a-phase inductor, a b-phase inductor and a c-phase inductor, respectively; the auxiliary power source comprises a current-limiting resistor, a DC-side circuit breaker and a battery connected with each other in series.

6. The transformer with flux linkage control according to claim 1, wherein when a single-phase dual-winding structure is adopted, the single-phase full-bridge converter is connected with the secondary winding of the main transformer in parallel; when a single-phase three-winding structure is adopted, the single-phase full-bridge converter is connected with the auxiliary winding of the main transformer in parallel; when a three-phase dual-winding structure is adopted, the secondary windings of the main transformer supply power for the load by a three-phase four-wire method; an a-phase output end, a b-phase output end and a c-phase output end of the three-phase half-bridge converter all of which are drawn out from a midpoint of the dc-link capacitor unit are respectively connected with a beginning of the a-phase secondary winding, a beginning of the b-phase secondary winding and a beginning of the c-phase secondary winding, the midpoint of the dc-link capacitor unit is connected with a neutral point of the a-phase secondary winding, the b-phase secondary winding and the c-phase secondary winding; when a three-phase three-winding structure is adopted, the auxiliary windings of the main transformer adopt a star-shaped neutral point connection method, the a-phase output end, the b-phase output end and the c-phase output end of the three-phase half-bridge converter all of which are drawn out from the midpoint of the dc-link capacitor unit are respectively connected with a beginning of the a-phase auxiliary winding, a beginning of the b-phase auxiliary winding and a beginning of the c-phase auxiliary winding, the midpoint of the dc-link capacitor unit is connected with a neutral point of the a-phase auxiliary winding, the b-phase auxiliary winding and the c-phase auxiliary winding.

7. A method for suppressing no-load closing magnetizing inrush current of a main transformer with flux linkage control, the method comprising: connecting a direct current/alternating current (DC/AC) converter with a secondary winding or an auxiliary winding of the main transformer in parallel, and pre-establishing a synchronous steady-state flux linkage for a main transformer core by controlling the DC/AC converter before the main transformer is connected to a power grid, so as to completely eliminate the magnetizing inrush current when the power grid is closed.

8. The method for suppressing the no-load closing magnetizing inrush current of the main transformer with the flux linkage control according to claim 7, wherein the method specifically comprises:
(1) before the main transformer is closed with no-load through a grid-side circuit breaker, charging a dc-link capacitor of the DC/AC converter through an auxiliary power source with small power, and when a voltage of the dc-link capacitor of the DC/AC converter reaches a stable value, disabling the auxiliary power source; and
(2) controlling the core flux linkage by controlling a terminal voltage of the DC/AC converter, tracking given steady-state references in real time by the core flux linkage of the main transformer for eliminating DC magnetic bias to fundamentally eliminate the magnetizing inrush current, and stopping the DC/AC converter after the grid-side circuit breaker is closed for finishing tracking.

9. The method for suppressing the no-load closing magnetizing inrush current of the main transformer with the flux linkage control according to claim 8, wherein in the step of (2), controlling the core flux linkage specifically comprises: according to a relationship between an amplitude of the core flux linkage and an effective value of the grid voltage, calculating the amplitude of the core flux linkage, and taking the calculated amplitude as a reference value of q-axis flux linkage in a dq synchronous rotating coordinate system; detecting an instantaneous value of the core flux linkage, constructing a quadrature flux linkage signal of the instantaneous value in a two-phase static coordinate system through 90-degree delay, performing coordinate transformation on the quadrature flux linkage signal in the two-phase static coordinate system, taking a q-axis flux linkage signal in the dq synchronous rotating coordinate system obtained by the coordinate transformation as an instantaneous feedback value of the core flux linkage, sending a deviation of the instantaneous feedback value from the reference value to a PI (proportional integral) controller, obtaining a q-axis modulation signal of the core flux linkage by calculating, setting a d-axis modulation signal of the core flux linkage to 0, performing inverse coordinate transformation on the q-axis modulation signal in the dq synchronous rotating coordinate system, obtaining a modulation signal in a static coordinate system, performing sinusoidal pulse width modulation (SPWM) on a α-axis modulation signal of the core flux linkage in the static coordinate system, obtaining a driving pulse of the single-phase full-bridge converter, and the single-phase full-bridge converter sending out a pulse voltage for controlling the core flux linkage.

10. The method for suppressing the no-load closing magnetizing inrush current of the main transformer with the flux linkage control according to claim 8, wherein in the step of (2), controlling the core flux linkage specifically comprises: according to a relationship between an amplitude of the core flux linkage and an effective value of the grid voltage, calculating the amplitude of the core flux linkage, taking the amplitude as a reference value of q-axis flux linkage in a dq0 synchronous rotating coordinate system, and setting a reference value of d-axis flux linkage and a reference value of 0-axis flux linkage to 0; detecting an instantaneous value of the three-phase core flux linkage, obtaining an a-axis flux linkage signal, a b-axis flux linkage signal and a c-axis flux linkage signal of a three-phase static coordinate system, performing coordinate transformation on the a-axis flux linkage signal, the b-axis flux linkage signal and the c-axis flux linkage signal of the three-phase static coordinate system, obtaining a d-axis flux linkage signal, a q-axis flux linkage signal and a 0-axis flux linkage signal in the dq0 synchronous rotating coordinate system, respectively taking the d-axis flux linkage signal, the q-axis flux linkage signal and the 0-axis flux linkage signal as an instantaneous feedback value of the d-axis flux linkage, an instantaneous feedback value of the q-axis flux linkage, and an instantaneous feedback value of the 0-axis flux linkage, sending a deviation of the instantaneous feedback value of the d-axis flux linkage from the reference value of the d-axis flux linkage, a deviation of the instantaneous feedback value of the q-axis flux linkage from the reference value of the q-axis flux linkage, and a deviation of the instantaneous feedback value of the 0-axis flux linkage from the reference value of the 0-axis flux linkage to the PI controller, obtaining a d-axis modulation signal, a q-axis modulation signal and a 0-axis modulation signal, performing inverse coordinate transformation on the d-axis modulation signal, the q-axis modulation signal and the 0-axis modulation signal in the dq0 synchronous rotating coordinate system, obtaining an a-axis modulation signal, a b-axis modulation signal and a c-axis modulation signal of a three-phase static coordinate system, performing SPWM on the a-axis modulation signal, the b-axis modulation signal and the c-axis modulation signal, obtaining a driving pulse of the three-phase half-bridge converter, and the three-phase half-bridge converter sending out a pulse voltage for controlling the core flux linkage, wherein a neutral line for splitting dc-link capacitors of a dc-link capacitor unit is drawn out.

* * * * *